United States Patent
Kamiyama et al.

(10) Patent No.: US 11,088,383 B2
(45) Date of Patent: *Aug. 10, 2021

(54) FUEL CELL VEHICLE

(71) Applicant: Toyota Jidosha Kabushiki Kaisha, Toyota (JP)

(72) Inventors: Atsushi Kamiyama, Miyoshi (JP); Yoshihiro Kubota, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 317 days.

This patent is subject to a terminal disclaimer.

(21) Appl. No.: 16/278,997

(22) Filed: Feb. 19, 2019

(65) Prior Publication Data

US 2019/0260060 A1 Aug. 22, 2019

(30) Foreign Application Priority Data

Feb. 21, 2018 (JP) .............................. JP2018-028722

(51) Int. Cl.
*H01M 8/2475* (2016.01)
*H01M 8/04082* (2016.01)
(Continued)

(52) U.S. Cl.
CPC ............ *H01M 8/2475* (2013.01); *B60K 1/04* (2013.01); *B60L 50/72* (2019.02);
(Continued)

(58) Field of Classification Search
None
See application file for complete search history.

(56) References Cited

U.S. PATENT DOCUMENTS 10,916,791 B2 * 2/2021 Aisima ................. B60K 1/04
2015/0244006 A1 * 8/2015 Yoshitomi ......... H01M 8/04201
429/446
(Continued)

FOREIGN PATENT DOCUMENTS

JP 2017074819 A 4/2017

OTHER PUBLICATIONS

Notice of Allowance dated Oct. 2, 2020 in U.S. Appl. No. 16/238,109.
(Continued)

*Primary Examiner* — Alix E Eggerding
(74) *Attorney, Agent, or Firm* — Dinsmore & Shohl LLP (57) ABSTRACT

A fuel cell vehicle that reduces damage on a fuel gas pump and deformation of a dash panel toward a cabin side when the vehicle collides head-on. The fuel gas pump is secured to a stack frame via a bracket such that a rotation, axis line of a motor adapted to drive a fuel gas pump inclines with respect to a reference line along the from-rear direction of the vehicle in plan view of the vehicle. Two fastening members secure the stack frame to the bracket in a state of being respectively inserted through a through hole and a cutout portion formed at a mounting portion. The cutout portion is formed such that, when the bracket turns together with the fuel gas pump with respect to the stack frame using one fastening member as a rotational center, the other fastening member exits out of an opening of the cutout portion.

5 Claims, 7 Drawing Sheets

(51) Int. Cl.
  *B60K 1/04* (2019.01)
  *B60L 50/72* (2019.01)
(52) U.S. Cl.
  CPC . *H01M 8/04201* (2013.01); *B60K 2001/0411* (2013.01); *H01M 2250/20* (2013.01)

(56) References Cited

U.S. PATENT DOCUMENTS

2017/0101031 A1    4/2017   Ohashi
2018/0166733 A1    6/2018   Kamino et al.
2018/0358637 A1   12/2018   Takeyama et al.
2020/0361300 A1*  11/2020   Swoish .................. B60L 50/66

OTHER PUBLICATIONS

Corrected Notice of Allowance dated Oct. 6, 2020 in U.S. Appl. No. 16/238,109.

* cited by examiner

FUEL CELL VEHICLE

CROSS REFERENCE TO RELATED APPLICATIONS

The present application claims priority from Japanese Patent Application JP 2018-028722 filed on Feb. 21, 2018, the content of which is hereby incorporated by reference into this application.

BACKGROUND

Technical Field

The present disclosure relates to a fuel cell vehicle that includes a fuel cell stack.

Background Art

Conventionally, a fuel cell vehicle includes a fuel cell stack and its peripheral devices (auxiliary machines) in a front compartment on the front side of the vehicle. The fuel cell stack is placed on a stack frame secured to the front compartment, and the auxiliary machines such as a compressor and a fuel gas pump are mounted to a lower portion of the stack frame (see, for example, JP 2017-74819 A).

SUMMARY

Here, the fuel gas pump mounted to the lower portion of the stack frame collects a fuel off-gas from the fuel cell stack, and supplies a part of the collected fuel off-gas to the fuel cell stack as a fuel gas again. Since the fuel cell stack is placed on the stack frame, to circulate the fuel off-gas to the fuel cell stack with the fuel gas pump in a shorter route, it is assumed that, for example, the fuel gas pump is mounted to the stack frame by projecting from the stack frame toward the dash panel side.

However, in such a mounting state, in the case where the fuel cell vehicle collides head-on, the fuel cell stack and the auxiliary machines mounted to the stack frame move to the dash panel side with the stack frame. At this time, the fuel gas pump projecting from the stack frame may be pushed into a dash panel so as to damage the fuel gas pump and deform the dash panel toward a cabin side.

The present disclosure has been made in view of the above-described problems, and provides a fuel cell vehicle that ensures reduced damage on a fuel gas pump and a deformation of a dash panel toward the cabin side when a vehicle collides head-on.

In view of the above-described problem, a fuel cell vehicle according to the present disclosure includes a fuel cell stack and a fuel gas pump that circulates, a part of a fuel off-gas discharged from the fuel cell, stack to the fuel cell stack. The fuel cell vehicle includes a front compartment and a dash panel in the front side of the vehicle. The front compartment houses the fuel cell stack and the fuel gas pump. The dash panel partitions the front compartment and a cabin. The fuel cell stack is placed on a stack frame, and the stack frame is secured to the front compartment. The fuel gas pump is mounted to a lower portion of the stack frame in a state of projecting from the stack frame toward the dash panel side. The fuel gas pump is secured to the stack frame via a bracket such that a rotation axis line of a motor adapted to drive the fuel gas pump inclines with respect to a reference line along the front-rear direction of the fuel cell vehicle in plan view of the fuel cell vehicle. The bracket has a mounting portion in a flat plate shape extending in the horizontal direction, and the bracket is attached to the stack frame with two fastening members at the mounting portion. One fastening member among the two fastening members secures the stack frame to the bracket in a state of being inserted through a through hole formed at the mounting portion, and the other fastening member secures the stack frame to the bracket in a state of being inserted through a cutout portion formed at the mounting portion. The cutout portion is formed such that the other fastening member exits out of an opening of the cutout portion when the bracket turns together with the fuel gas pump with respect to the stack frame using the one fastening member inserted through the through hole as a rotational center.

With the present disclosure, the stack frame mounted to the front compartment moves toward the dash panel side when the vehicle collides head-on. At this time, since the fuel gas pump is mounted to the lower portion of the stack frame in a state of projecting from the stack frame toward the dash panel side, the fuel gas pump moves together with the stack frame toward the dash panel side, and the fuel gas pump contacts the dash panel.

Here, the fuel gas pump is secured to the stack frame via the bracket such that the rotation axis line of the motor adapted to drive the fuel gas pump inclines with respect to the reference line along the front-rear direction of the fuel cell vehicle in plan view of the fuel cell vehicle. This causes a moment to act on the fuel gas pump when the fuel gas pump contacts the dash panel, and the fuel gas pump attempts to turn in the direction moving away from the dash panel.

At this time, the bracket turns together with the fuel gas pump with respect to the stack frame using the one fastening member inserted through the through hole as the rotational center, and the other fastening member exits out of the opening of the cutout portion. Accordingly, the fuel gas pump effortlessly tarns together with the bracket, thereby ensuring avoiding the fuel gas pump from pushing the dash panel into the cabin side. As a result, the damage on the fuel gas pump can be reduced and the deformation of the dash panel toward the cabin side by the fuel gas pump can be reduced.

The fuel cell vehicle of the present disclosure can reduce the damage on the fuel gas pump and the deformation of the dash panel toward the cabin side when the vehicle collides head-on.

DETAILED DESCRIPTION

Figure 1:
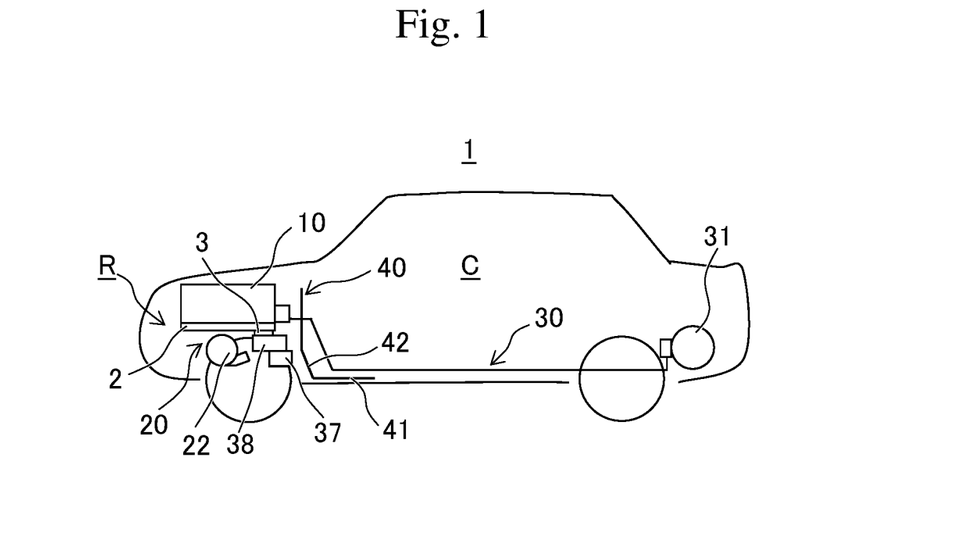
FIG. 1 is a conceptual diagram of one embodiment of a fuel cell vehicle according to the present disclosure.
Figure 2:
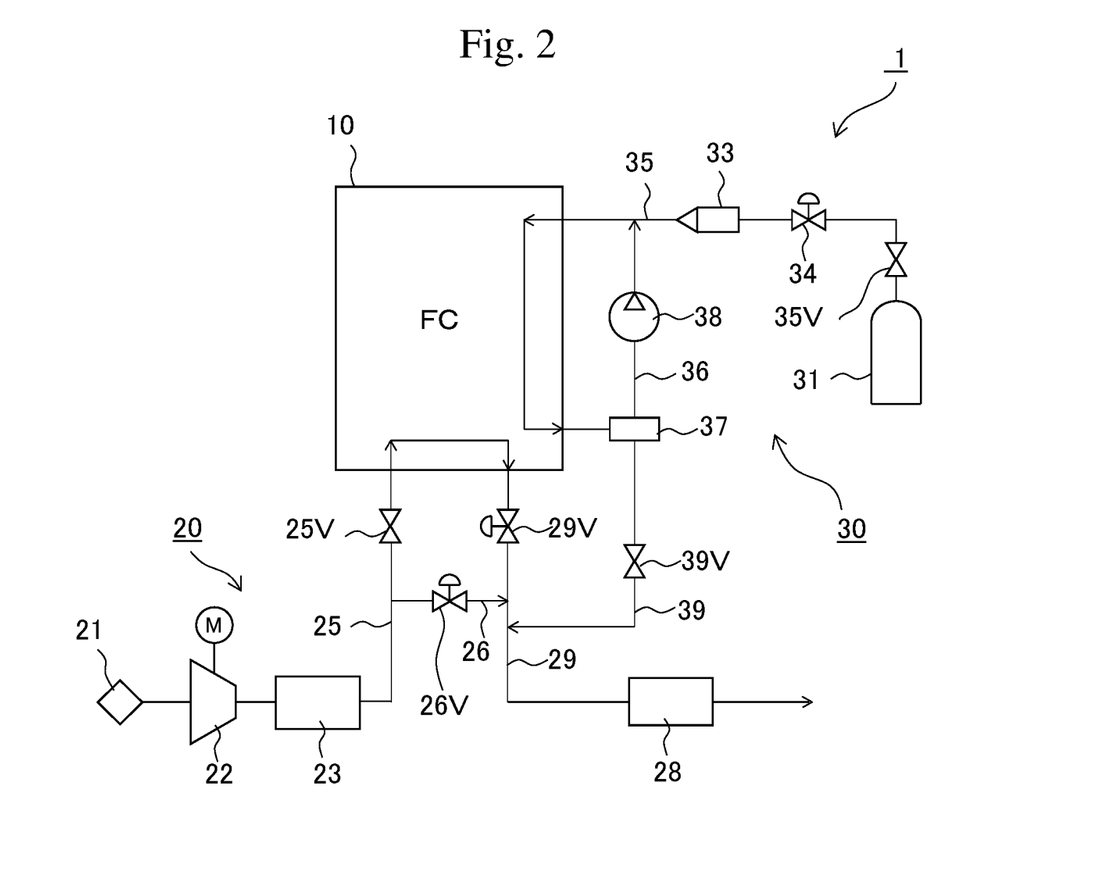
FIG. 2 is a system block diagram of a fuel cell system used in the fuel cell vehicle illustrated in FIG. 1.
Figure 3:
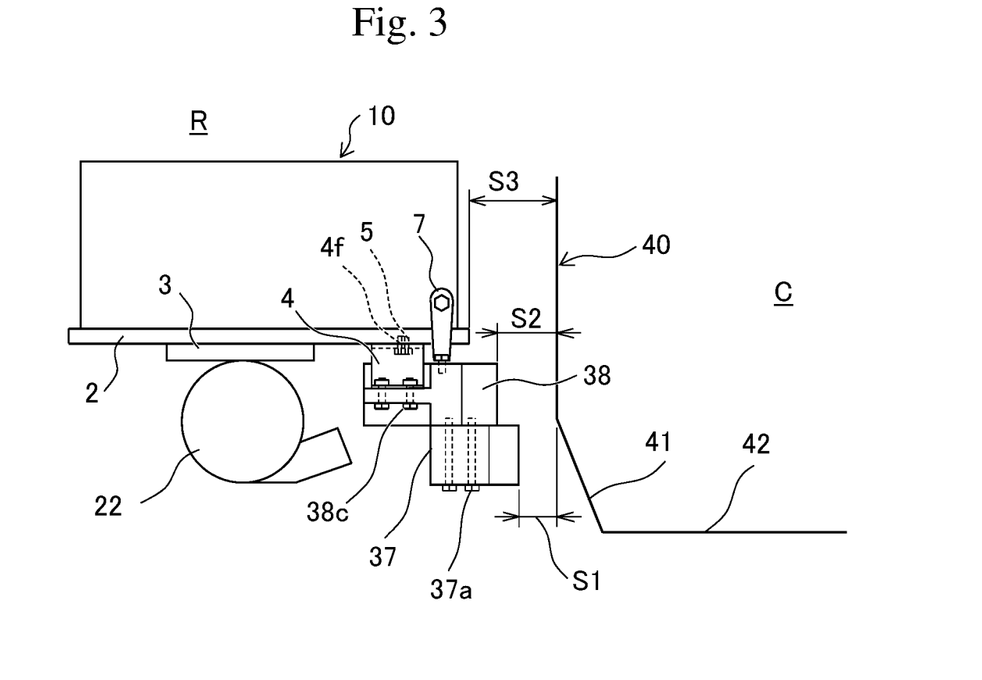
FIG. 3 is a main part schematic diagram illustrating a side surface of a main part of the fuel cell vehicle in the one embodiment illustrated in FIG. 1.
Figure 4:
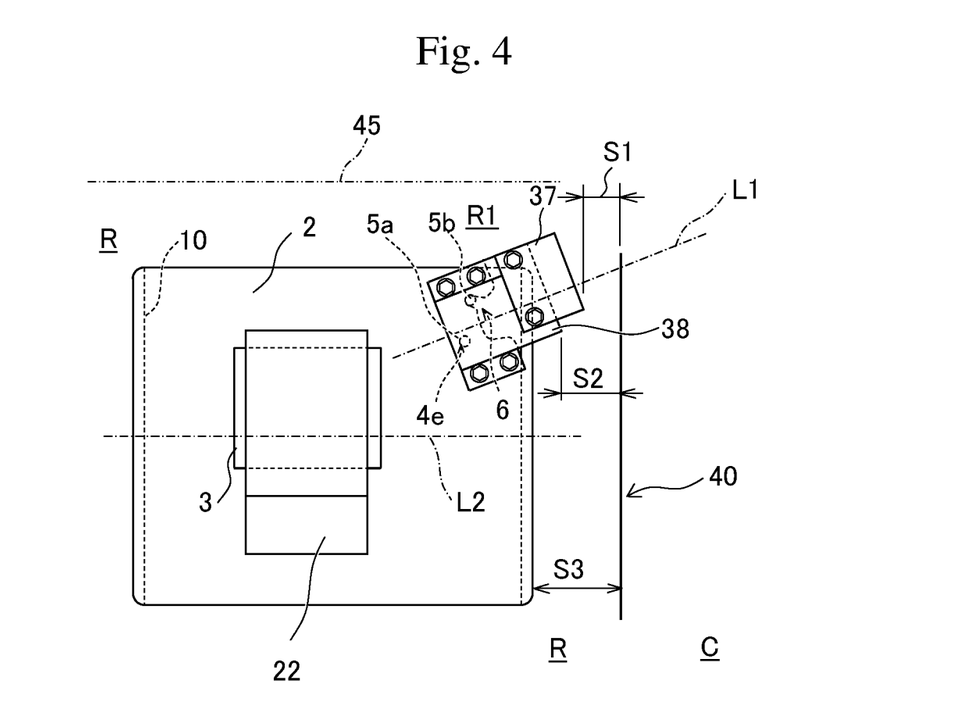
FIG. 4 is a main pan schematic diagram illustrating a bottom surface of the main part illustrated in FIG. 3.
Figure 5:
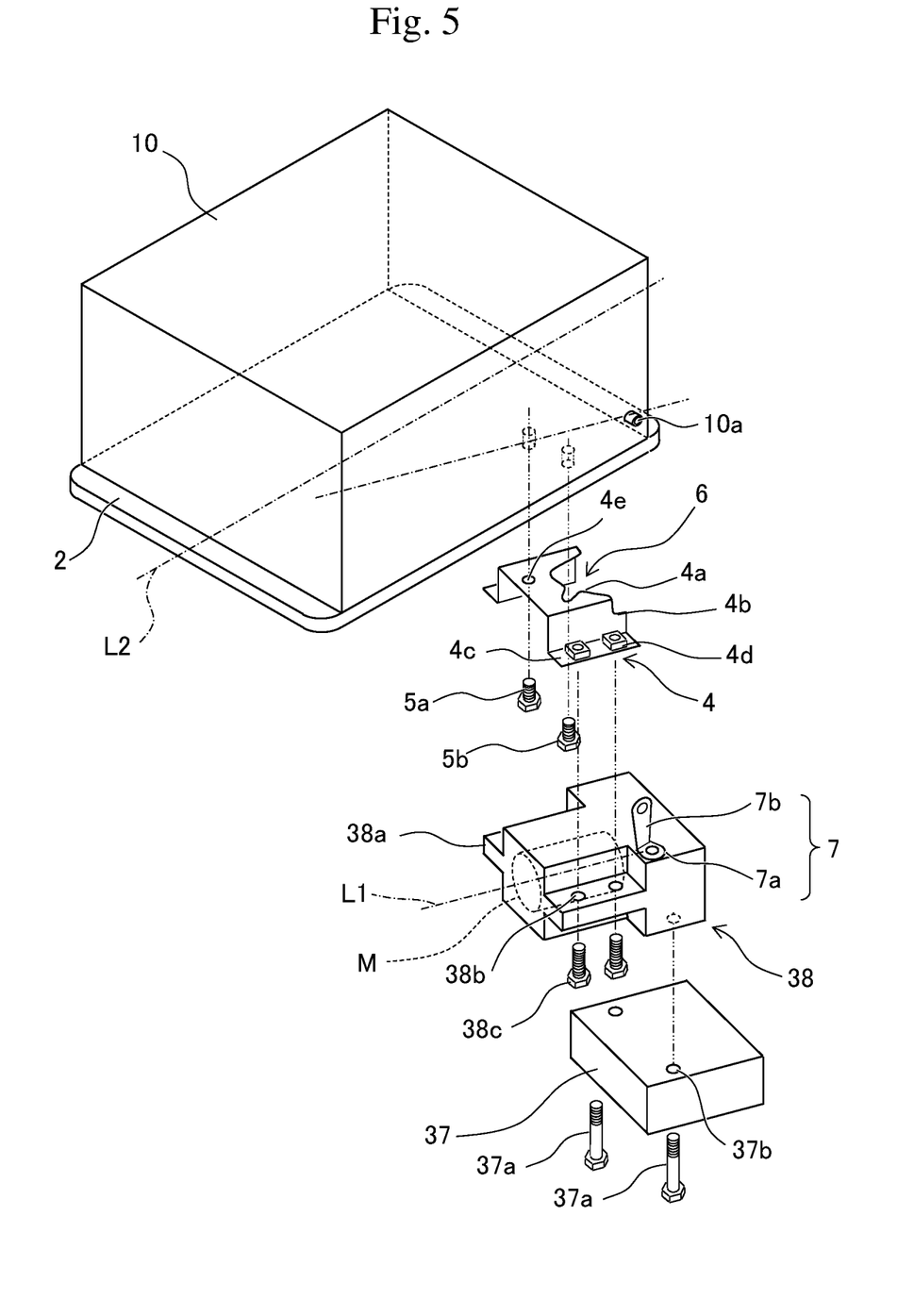
FIG. 5 is a developed perspective view of the main part illustrated in FIG. 3 and FIG. 4.

The following describes one embodiment of a fuel cell vehicle according to the present disclosure with reference to the drawings in detail. FIG. 1 is a conceptual diagram of the fuel cell vehicle according to the embodiment, and FIG. 2 is a system block diagram of a fuel cell system used in the fuel cell vehicle illustrated in FIG. 1. FIG. 3 is a main part schematic diagram illustrating a side surface of a main part of the fuel cell vehicle in the one embodiment illustrated in FIG. 1 and FIG. 2. FIG. 4 is a main part schematic diagram illustrating a bottom surface of the main part illustrated in FIG. 3. FIG. 5 is a developed perspective view of the main part illustrated in FIG. 3 and FIG. 4.

First, the fuel cell vehicle according to the present disclosure will be described with reference to FIG. 1. In FIG. 1, a fuel cell vehicle 1 is a vehicle such as a passenger car, and has a front compartment R on the front side of the vehicle. The front compartment R houses a fuel cell stack 10, a compressor 22, a gas-liquid separator 37, and a fuel gas pump 38 such as a hydrogen, pump. The compressor 22, the gas-liquid separator 37, and the fuel gas pump 38 are included as a part of the auxiliary machines. The compressor 22 constitutes a part of an oxidant gas supply system 20 that supplies an oxidant gas to the fuel cell stack 10. The gas-liquid separator 37 and the fuel gas pump 38 constitute a circulation passage 36 that circulates a fuel off-gas discharged from the fuel cell stack 10 to the fuel cell stack 10 (see FIG. 2).

The fuel cell vehicle 1 includes a dash, panel 40 between the front compartment R and a cabin C, on which a passenger rides, to partition them in the front side of the vehicle. The dash panel 40 is a metallic panel formed of, for example, steel or aluminum alloy, and has a high rigidity compared with that of the gas-liquid separator 37. The dash panel 40 includes a floor board 41 that constitutes a floor surface of the cabin C and a toe board 42 that inclinedly extends upward from this floor board 41. The dash panel 40 includes a reinforcing material (not illustrated) to ensure a space for the cabin C. This reinforcing material has a high rigidity compared with that of the fuel gas pump 38.

As illustrated in FIG. 3, the fuel cell stack 10 is placed on a top of a stack frame 2, and the stack frame 2 is secured to the front compartment R. The compressor 22 is mounted and secured to a lower portion of the stack frame 2 via a compressor bracket 3 in a suspended state. The fuel gas pump 38 is mounted to the lower portion of the stack frame 2 in a state of projecting from the stack frame 2 toward the dash panel 40 side and a state of being suspended via a bracket 4.

The gas-liquid separator 37 is mounted to a lower portion of the fuel gas pump 38 in a state of projecting from the stack frame 2 and the fuel gas pump 38 toward, the dash panel 40 side. The fuel gas pump 38 is a metallic device made of a metallic material such as an iron-based material and an aluminum-based material, and the gas-liquid separator 37 is a device made of resin such as polyphenylene sulfide (PPS) and polyamide (PA). The fuel cell vehicle 1 has a rear portion to which a fuel gas supply source 31, which constitutes a fuel gas supply system 30 to supply hydrogen gas to the fuel cell stack 10, is mounted.

Next, the system configuration of the fuel cell system used in the fuel cell vehicle 1 according to this embodiment will be described with reference to FIG. 2. The fuel cell system illustrated in FIG. 2 includes, for example, the fuel cell (fuel cell stack) 10, the oxidant gas supply system 20, and the fuel gas supply system 30. The fuel cell (fuel cell stack) 10 includes a plurality of stacked cells for fuel cell as unit cells. The oxidant gas supply system 20 supplies the fuel cell 10 with an oxidant gas such as air. The fuel gas supply system 30 supplies the fuel cell 10 with a fuel gas such as hydrogen.

For example, the cell for fuel cell of the solid polymer fuel cell 10 includes a Membrane Electrode Assembly (MEA), which includes an ion permeable electrolyte membrane, an anode side catalyst layer (anode electrode), and a cathode side catalyst layer (cathode electrode). This electrolyte membrane is sandwiched between the anode side catalyst layer and the cathode side catalyst layer. The MEA has both sides on which Gas Diffusion Layers (GDLs) are formed to supply the fuel gas or the oxidant gas and collect electricity generated through an electrochemical reaction. The Membrane Electrode Assembly having both sides on which the GDLs are disposed is referred to as a Membrane Electrode & Gas Diffusion Layer Assembly (MEGA), and the MEGA is sandwiched by a pair of separators. Here, the MEGA serves as a power generation unit of the fuel cell, and when the gas diffusion layer is not disposed, the MEA serves as the power generation unit of the fuel cell.

The oxidant gas supply system 20 includes, for example, an oxidant gas supply passage 25 and an oxidant gas discharge passage 29. The oxidant gas supply passage 25 supplies (the cathode electrode of) the fuel cell 10 with the oxidant gas. The oxidant gas discharge passage 29 discharges an oxidant off-gas, in which the oxidant gas has been supplied to the fuel cell 10 and has been used for the electrochemical reaction in each of the cells for fuel cell, from the fuel cell 10. Furthermore, a bypass passage 26 is disposed to flow the oxidant gas supplied via the oxidant gas supply passage 25 to the oxidant gas discharge passage 29 without via the fuel cell 10. The flow passages of the oxidant gas supply system 20 can be each formed of a pipe such as a rubber hose and a metallic pipe.

The oxidant gas supply passage 25 includes, for example, an air cleaner 21, the compressor 22, and an intercooler 23 from the upstream side, and the oxidant gas discharge passage 29 includes, for example, a muffler 28. (The air cleaner 21 of) the oxidant gas supply passage 25 includes, for example an atmospheric pressure sensor and an air flow meter, which are not illustrated.

On the oxidant gas supply passage 25, the air cleaner 21 removes dust in the oxidant gas (air and the like) taken from the atmosphere. The compressor 22 compresses the oxidant gas taken in via the air cleaner 21 and pressure-feeds the compressed oxidant gas to the intercooler 23. The intercooler 23 cools the oxidant gas, which is pressure-fed from the compressor 22 and taken in, through, for example, a heat exchange with a coolant to supply to (the cathode electrode of) the fuel cell 10 when the oxidant gas passes through. The oxidant gas supply passage 25 includes an inlet valve 25V to shut off the flow of the oxidant gas between the intercooler 23 and the fuel cell 10.

The bypass passage 26 has one end coupled to (the intercooler 23 or its downstream side of) the oxidant gas supply passage 25, and the other end coupled to the oxidant gas discharge passage 29. The oxidant gas that has been pressure-fed by the compressor 22 and has been cooled and discharged by the intercooler 23 flows through the bypass passage 26 toward the oxidant gas discharge passage 29 while bypassing the fuel cell 10. This bypass passage 26 includes a bypass valve 26V that shuts off the oxidant gas flowing toward the oxidant gas discharge passage 29 to adjust a flow rate of the oxidant gas flowing through this, bypass passage 26.

On the oxidant gas discharge passage 29, the muffler 28 separates the oxidant off-gas (exhaust gas) flowing into the oxidant gas discharge passage 29 into, for example, a gas phase and a liquid phase to discharge outside. The oxidant gas discharge passage 29 includes a pressure regulating valve 29V to regulate a back-pressure of the oxidant gas supplied to the fuel cell 10. The above-described bypass passage 26 is coupled to the downstream side of the pressure regulating valve 29V.

Meanwhile, the fuel gas supply system 30 includes, for example, the fuel gas supply source 31 such as a hydrogen tank, a fuel gas supply passage 35, the circulation passage 36, and a fuel gas discharge passage 39. The fuel gas supply source 31 stores a high pressure fuel gas such as hydrogen. The fuel gas supply passage 35 supplies the fuel gas from the fuel gas supply source 31 to (the anode electrode of) the fuel cell 10. The circulation passage 36 recirculates part of the fuel off-gas (unconsumed fuel gas) discharged from the fuel cell 10 to the fuel gas supply passage 35. The fuel gas discharge passage 39 is branched and coupled to the circulation passage 36 to discharge the fuel off-gas inside the circulation passage 36 to the outside (atmospheric release). The flow passages of the fuel gas supply system 30 can be, each formed of a pipe such as a rubber hose and a metallic pipe.

The fuel gas supply passage 35 includes a shut-off valve 35V, a regulator 34, and an injector 33. The shut-off valve 35V opens and closes the fuel gas supply passage 35 to shut off the fuel gas flowing toward the fuel cell 10. The regulator 34 regulates (decompresses) a pressure of the fuel gas flowing through the fuel gas supply passage 35. The injector 33 supplies the fuel gas whose pressure has been regulated toward the fuel cell 10. Opening the shut-off valve 35V causes the high pressure fuel gas stored in the fuel gas supply source 31 to flow into the fuel gas supply passage 35 from the fuel gas supply source 31, and the high pressure fuel gas is supplied to (the anode electrode of) the fuel cell 10 with the pressure regulated (decompressed) by the regulator 34 and the injector 33.

The circulation passage 36 includes the gas-liquid separator 37, a fuel gas pump (hydrogen pump in other words) 38, and the like from the upstream side (fuel cell 10 side). The gas-liquid separator 37 performs gas-liquid separation to store generated water contained in the fuel gas (for example, hydrogen) flowing through the circulation passage 36. The fuel gas discharge passage 39 branches from this gas-liquid separator 37. The fuel gas pump 38 pressure-feeds a part of the fuel off-gas from which the liquid component has been separated through the gas-liquid separation by the gas-liquid separator 37 to circulate the part of the fuel off-gas into the fuel gas supply passage 35.

The fuel gas discharge passage 39 includes a purge valve 39V that opens and closes the fuel gas discharge passage 39 to discharge the generated water separated by the gas-liquid separator 37 and a part of the fuel off-gas discharged from the fuel cell 10. The fuel off-gas is discharged through the opening/closing adjustment by the purge valve 39V of the fuel gas discharge passage 39, mixed with the oxidant off-gas flowing through the oxidant gas discharge passage 29, and released outside into the atmosphere via the muffler 28.

The fuel cell system having the above-described configuration performs the electric generation through the electrochemical reaction between the oxidant gas such as air supplied to (the cathode electrode of) the fuel cell 10 by the oxidant gas supply system 20 and the fuel gas such as hydrogen supplied to (the anode electrode of) the fuel cell 10 by the fuel gas supply system 30.

Next, distinctive configurations of the fuel cell vehicle 1 according to this embodiment will be described in detail with reference to FIG. 3 to FIG. 6B. The fuel cell vehicle 1 of this embodiment includes the compressor 22, the gas-liquid separator 37, and the fuel gas pump 38 in the front compartment R. The compressor 22 compresses and discharges the oxidant gas supplied to the fuel cell stack 10. The gas-liquid separator 37 separates the gas and the liquid from the fuel off-gas discharged from the fuel cell stack 10. The fuel gas pump 38 is, for example, a hydrogen pump, and circulates a part of the fuel off-gas from which the liquid component has been separated by the gas-liquid separator 37 to the fuel cell stack 10.

More specifically, the fuel cell stack 10 is mounted on the top of the stack frame 2, and the compressor 22 is mounted to the lower portion of the stack frame 2 via the compressor bracket 3 on the vehicle front side with respect to the fuel gas pump 38.

The fuel gas pump 38 includes a motor M to suction the fuel gas and discharge the suctioned fuel gas outside. The fuel gas pump 38 is mounted to the lower portion of the stack frame 2 via the bracket 4 on the vehicle rear side with respect to the compressor 22 in a state of projecting from the stack frame 2 toward the dash panel 40 side. Furthermore, the fuel gas pump 38 is secured to the fuel cell stack 10 (specifically, a stack case) via an auxiliary bracket 7.

The gas-liquid separator 37 is mounted to the lower portion of the fuel gas pump 38 in a state of projecting from the stack frame 2 and the fuel gas pump 38 toward the dash panel 40 side with fastening members 37a such as bolts inserted through through holes 37b.

In such a mounting state, the fuel gas pump 38 has an end surface in the vehicle rear side projecting rearward with respect to an end surface of the fuel cell stack 10 in the vehicle rear side, and the gas-liquid separator 37 has an end surface in the vehicle rear side projecting rearward with respect to the end surface of the fuel gas pump 38 in the vehicle rear side.

Specifically, spaces S1 to S3 between the dash panel 40 and the gas-liquid separator 37, the fuel gas pump 38, and the stack frame 2 in the front-rear direction of the fuel cell vehicle 1 fulfill the following relationship. Among these spaces S1 to S3, the space S1 between the dash panel 40 and the gas-liquid separator 37 is smallest, the space S2 between the dash panel 40 and the fuel gas pump 38 is larger than the space S1, and the space S3 between the dash panel 40 and the stack frame 2 is further larger than the space S2.

The gas-liquid separator 37 closest to the dash panel 40 is substantially made of resin, and has a low rigidity compared with that of the fuel gas pump 38. Furthermore, the fuel gas pump 38 is substantially made of metal, and has a high rigidity compared with that of the gas-liquid separator 37.

As illustrated in FIG. 4 and FIG. 5, in the fuel cell vehicle 1, the fuel gas pump 38 is secured to the stack frame 2 via the bracket 4 such that the rotation axis line L1 of the motor M adapted to drive the fuel gas pump 38 inclines with respect to the reference line L2 along the front-rear direction of the fuel cell vehicle 1 in plan view of the fuel cell vehicle 1. In some embodiments, the rotation axis line L1 has an inclination angle with respect to the reference line L2 of, for example, 20 degrees or more and 40 degrees or less.

In view of this, the fuel gas pump 38 is obliquely arranged and secured with respect to the travelling direction of the fuel cell vehicle 1, a rear corner portion of the fuel gas pump 38 faces a front surface of the dash panel 40, and this corner portion is close to the dash panel 40. A rear corner portion of the gas-liquid separator 37 also faces the front surface of the dash panel 40, and this corner portion is further close to the dash panel 40. As described above, since the fuel gas pump 38 is inclinedly secured to the stack frame 2, the fuel gas pump 38 can turn so as to move away from the dash panel 40 when the corner portion in the vehicle rear side of the fuel gas pump 38 abuts on the dash panel 40.

In this embodiment, as illustrated in FIG. 4, the fuel gas pump 38 is mounted to the stack frame 2 near a front fender 45, and the rotation axis line L1 of the motor M is inclined so as to approach a center line along the front-rear direction of the fuel cell vehicle 1 as approaching the vehicle front side. In FIG. 4, this center line is drawn so as to match the above-described reference line L2. Such an arrangement turns the fuel gas pump 38 in the space R1 in the front compartment R in plan view of the fuel cell vehicle 1 at a time of a collision, and thus, the fuel gas pump 38 can avoid contacting other auxiliary machines mounted to the lower portion of the stack frame 2.

The bracket 4 made of metal such as steel or aluminum is a member to mount and secure the fuel gas pump 38 to the stack frame 2, and has a mounting portion 4a in a flat plate shape extending, in the horizontal direction. The mounting portion 4a is a flat plate-shaped portion to attach the bracket 4 to the stack frame 2. The bracket 4 is attached to the stack frame 2 at the mounting portion 4a with fastening members 5a, 5b such as two bolts.

Furthermore, the bracket 4 includes sandwiching portions 4b, 4b extending downward from both sides of the mounting portion 4a to sandwich the fuel gas pump 38. Moreover, the bracket 4 includes mounting portions 4c, 4c extending outward from the sandwiching portions 4b, 4b. The mounting portions 4c are portions to attach the bracket 4 to the fuel gas pump 38. Accordingly, the bracket 4 becomes a member disposed on the fuel gas pump 38 and formed in an approximately saddle shape. Furthermore, two weld nuts 4d are fixedly secured on each of the mounting portions 4c, 4c, four of the weld nuts 4d in total, to secure the fuel gas pump 38 to the bracket 4.

The mounting portion 4a of the bracket 4 has a through hole 4e to secure (support) this bracket 4 to the stack frame 2. Among the above-described two fastening members 5a, 5b, one fastening member 5a secures the stack frame 2 to the bracket 4 in a state of being inserted through the through hole 4e.

In this embodiment, the fastening member 5a is inserted through the through hole 4e, and the fastening member 5a is screwed into a female screw hole opened on a lower surface of the stack frame 2. Thus, the bracket 4 is sandwiched between a head of the fastening member 5a and the stack frame 2. Accordingly, the bracket 4 is secured to the lower portion of the stack frame 2. With this through hole 4e, the fuel gas pump 38 is secured (supported) turnably in the horizontal direction around the fastening member 5a inserted though the through hole 4e of the bracket 4.

Furthermore, the mounting portion 4a of the bracket 4 has an edge portion where a cutout portion 6 is formed. Among the two fastening members 5a, 5b, the other fastening member 5b secures the stack frame 2 to the bracket 4 in a state of being, inserted through the cutout portion 6. The cutout portion 6 has a recessed portion 6a into which a shaft portion of the other fastening member 5b fits and an opening 6b that opens from the recessed portion 6a. The cutout portion 6 is formed so as to expand toward the opening 6b from the recessed portion 6a.

In this embodiment, the fastening member 5b is inserted through the cutout portion 6, and the fastening member 5b is screwed into a female screw hole opened on the lower surface of the stack frame 2. Thus, the bracket 4 is sandwiched between a head of the fastening member 5b and the stack frame 2. Accordingly, the bracket 4 is secured to the lower portion of the stack frame 2. This achieves a state in which the other fastening member 5b engages with the cutout portion 6.

Furthermore, in this embodiment, the cutout portion 6 is formed such that the other fastening member 5b exits out of the opening 6b of the cutout portion 6 when the bracket 4 turns together with the fuel gas pump 38 with respect to the stack frame 2 using the one fastening member 5a inserted through the through hole 4e as a rotational center. As a result, as described later, the engagement of the other fastening member 5b with the cutout portion 6 is released when the bracket 4 turns using the one fastening member 5a as the rotational center at a time of a head-on collision of the fuel cell vehicle 1. Thus, the other fastening member 5b can be smoothly disengaged from the cutout portion 6.

The fuel gas pump 38 includes flanges 38a, 38a projecting from both side surfaces and extending in, the horizontal direction, and the flanges 38a, 38a have four through holes 38b corresponding to the four weld nuts 4d fixedly secured to the mounting portions 4c, 4c of the bracket 4. Bolts 38c and the like are inserted through these four through holes 38b, thus the fuel gas pump 38 can be mounted to the bracket 4 secured to the lower portion of the stack frame 2 with the fastening members 5a, 5b.

Figure 6A:
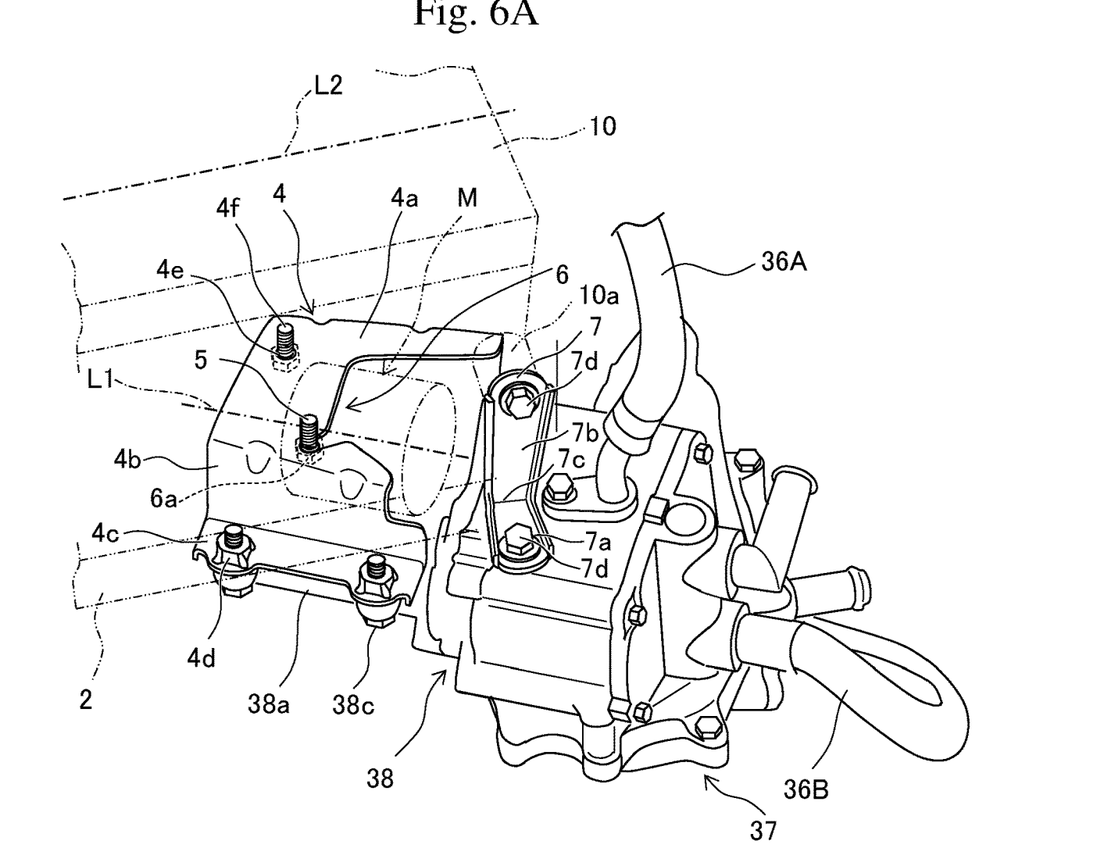
FIG. 6A is a main part perspective view of a fuel gas pump and a gas-liquid separator illustrated in FIG. 3 to FIG. 5.
Figure 6B:
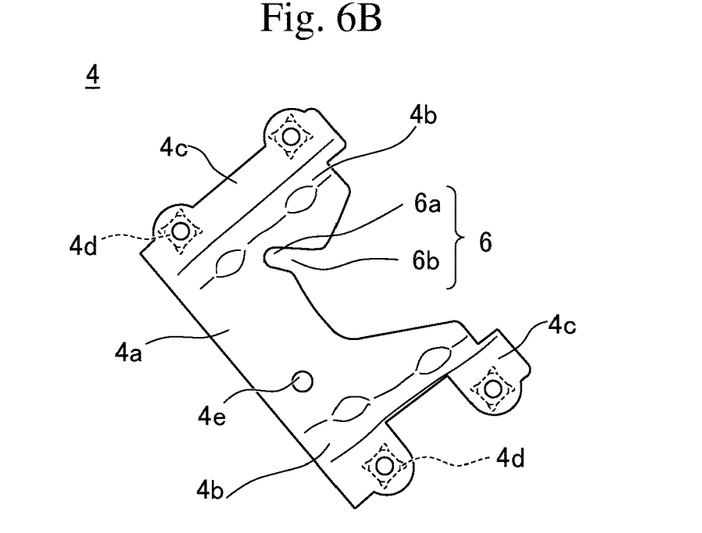
FIG. 6B is a bottom view of a bracket.

Furthermore, as illustrated in FIG. 6A and FIG. 6B, the top of the fuel gas pump 38 is attached to the fuel cell stack 10 via the auxiliary bracket 7. With this, the fuel gas pump 38 is mounted to the fuel cell stack 10 and the stack frame 2 via the two brackets of the bracket 4 and the auxiliary bracket 7, and thus, the mourning state of the fuel gas pump 38 stabilizes.

The auxiliary bracket 7 is, for example, a member made by press forming a plate material made of a metallic material. The auxiliary, bracket 7 is an L-shaped bracket having a first arm 7a and a second arm 7b. The first arm 7a and the second arm 7b are coupled by a bent portion 7c.

The first arm 7a is disposed on a top surface of the fuel gas pump 38, and secured to the fuel gas pump 38 by fastening a fastening member 7d such as the bolt to the fuel gas pump 38. Meanwhile, the second arm 7b extends to a side of the fuel cell stack 10 from the top surface of the fuel gas pump 38, and is secured to the fuel cell stack 10 by fastening the fastening member 7d to a female screw hole 10a (see FIG. 5) formed on a side surface of the fuel cell stack 10. Accordingly, the fuel gas pump 38 can be stably secured to the stack frame 2 on its top portion.

Furthermore, the auxiliary bracket 7 has a constricted shape at the bent portion 7c coupling the first arm 7a to the second arm 7b. That is, the widths of the first and the second arms 7a, 7b in the plate shapes decrease as approaching the bent portion 7c. Accordingly, making the bent portion where the auxiliary bracket 7 bends into the constricted shape ensures the reduced inhibition of the turn of the fuel gas pump 38 because the auxiliary bracket 7 easily deforms at the bent portion 7c when the fuel gas pump 38 turns at a time of a collision of the fuel cell vehicle 1.

In FIG. 6A, pipes 36A, 36B that constitute the circulation passage 36 coupled to the fuel gas pump 38 are flexible pipes made of rubber or resin. The pipe 36A is a pipe on the pump discharge side coupled to the fuel cell stack 10, and the pipe 36B is a pipe on the pump suction side coupled to the gas-liquid separator 37. Even when the fuel gas pump 38 turns at a time of a collision of the fuel cell vehicle 1, these pipes 36A, 36B as the flexible pipes ensures the reduced inhibition of this turn and also reducing damage on the pipes themselves.

In this embodiment, the gas-liquid separator 37 is made of resin, and mounted with the fastening members 37a such as bolts screwed into two female screw holes formed on the lower surface of the fuel gas pump 38. The gas-liquid separator 37 has a function to separate the gas and the liquid from the fuel off-gas discharged from the fuel cell stack 10. The separated liquid component joins with the oxidant off gas discharged from the fuel cell stack 10, and is discharged outside the fuel cell vehicle 1.

Figure 7:
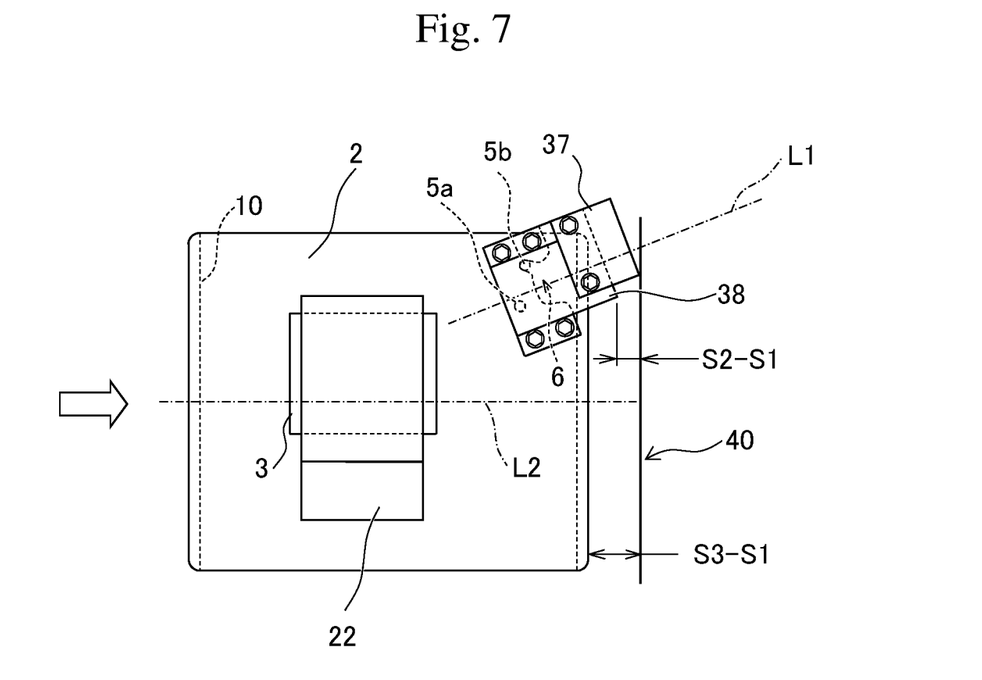
FIG. 7 is a main part schematic diagram illustrating a behavior at a time of a collision with a small impact.
Figure 8:
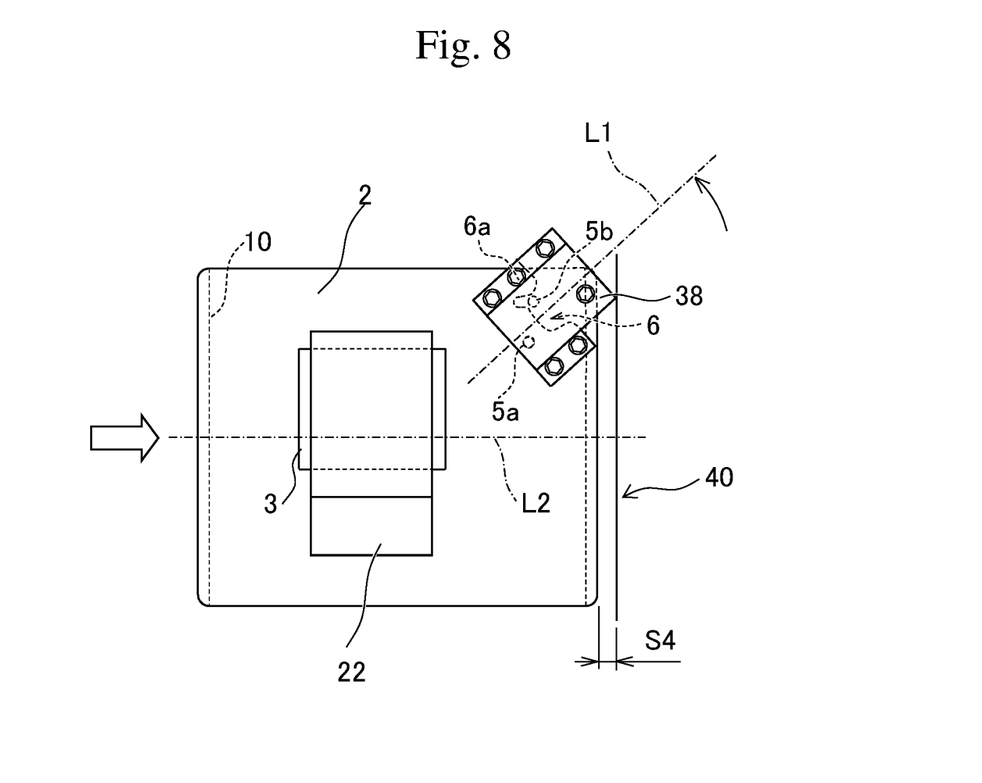
FIG. 8 is a main part schematic diagram illustrating a behavior at a time of a collision with large impact.
Figure 9:
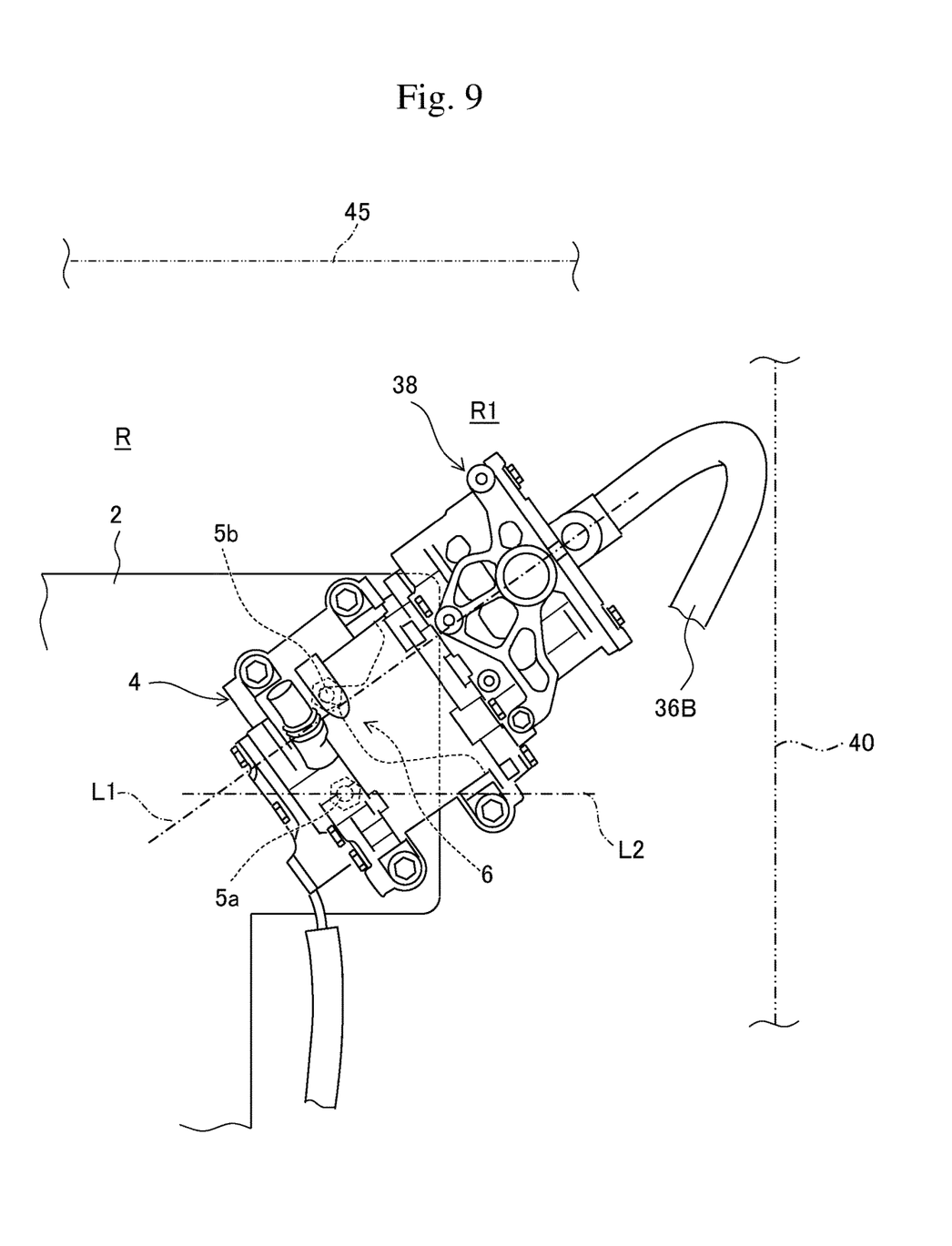
FIG. 9 is a lower surface view illustrating an ordinary arrangement position of the fuel gas pump.
Figure 10:
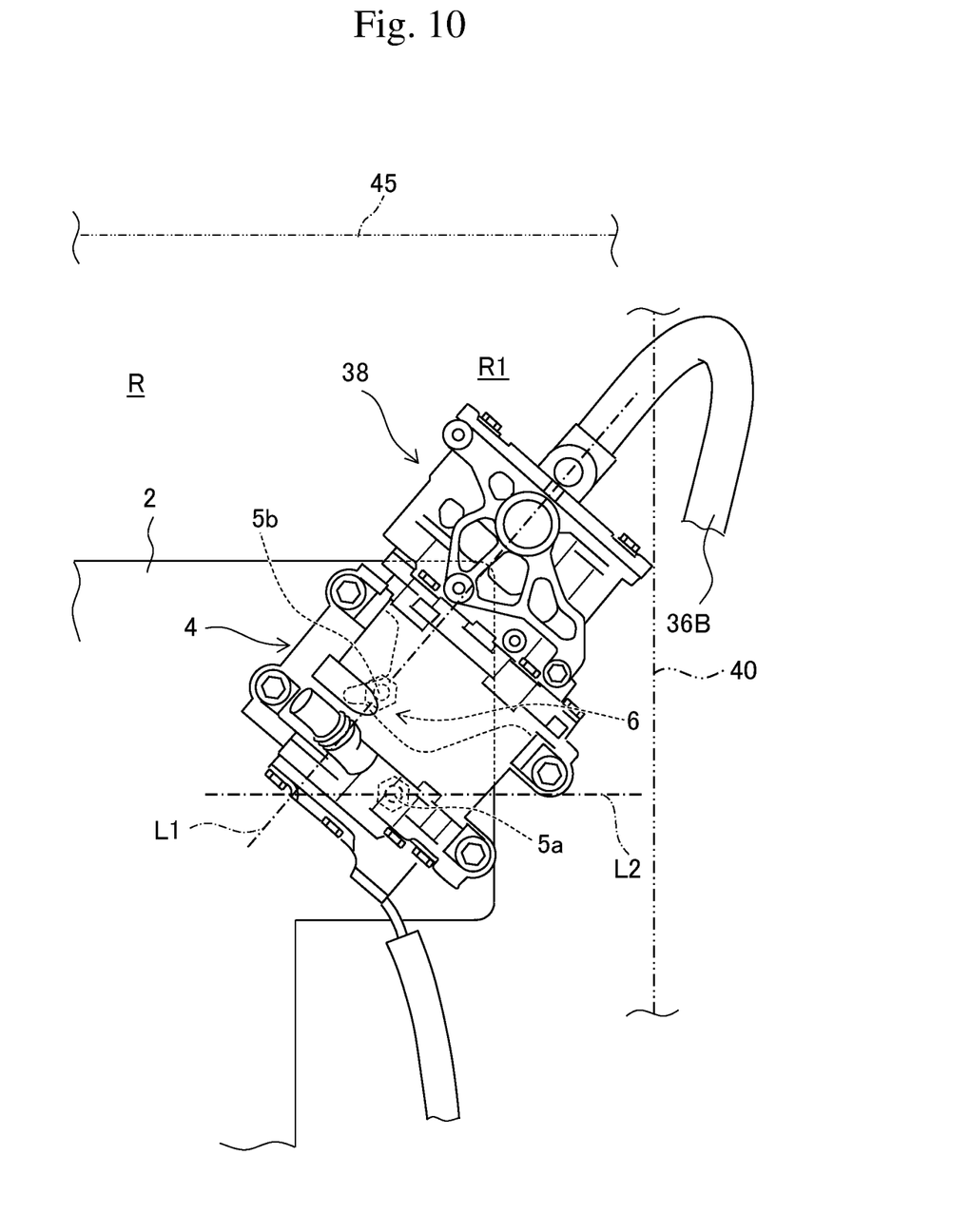
FIG. 10 is a lower surface view illustrating an arrangement position of the fuel gas pump when the fuel gas pump turns at a time of a collision.

Effects of the fuel cell vehicle 1 of the embodiment configured as described above will be described with reference to FIG. 7 to FIG. 10. FIGS. 7, 8 illustrate the fuel gas pump 38 in simplified schematic diagrams, whereas FIGS. 9, 10 illustrate the fuel gas pump 38 in detailed bottom views.

For example, when the fuel cell vehicle 1 collides against an obstacle and the like, the front compartment R of the vehicle is squashed and deformed, and the fuel cell stack 10 and the accompanied auxiliary machines are moved rearward by the obstacle. Specifically, the fuel cell stack 10, the compressor 22, the fuel gas pump 38, and the gas-liquid separator 37, which are mounted to the stack frame 2, move rearward to approach the dash panel 40.

When an impact of the collision is small, as illustrated in FIG. 7, the fuel cell stack 10 and the auxiliary machines only approach the dash panel 40. For example, when the gas-liquid separator 37 abuts on the dash panel 40, a space between the fuel gas pump 38 and the dash panel 40 changes to (S2-S1), and a space between the stack frame 2 and the dash panel 40 changes to (S3-S1), from the space illustrated in FIG. 3.

When the impact of the collision is large, the gas-liquid separator 37 positioned most rearward collides against the metallic dash, panel 40 and is broken. The gas-liquid separator 37 made of resin easily breaks to absorb the impact. In the case of further large impact, the fuel gas pump 38 collides against the dash panel 40. In the case where the gas-liquid separator 37 does not project from the fuel gas pump 38 toward the dash panel 40 side or the gas-liquid separator 37 is omitted, the fuel gas pump 38 collides against the dash panel 40 as described below.

When the fuel gas pump 38 collides against the dash panel 40, as illustrated in FIG. 8, the rear corner portion of the fuel gas pump 38 abuts on the dash panel 40 and a reactive force occurs on this rear corner portion. Here, as described above, the fuel gas pump 38 is secured to the stack frame 2 via the bracket 4 such that the rotation axis line L1 of the motor M adapted to drive the fuel gas pump 38 inclines with respect to the reference line L2 along the front-rear direction of the fuel cell vehicle 1 in plan view of the fuel cell vehicle 1. This causes a moment to act on the fuel gas pump 38 when the fuel gas pump 38 contacts the dash panel 40, and the fuel gas pump 38 attempts to turn in the direction moving away from the dash panel 40 as illustrated in FIG. 8.

At this time, as illustrated in FIG. 8 and FIG. 10, the bracket 4 turns together with the fuel gas pump 38 in the counterclockwise direction (direction to the outside of the vehicle) with respect to the stack frame 2 using the one fastening member 5a inserted through the through hole as the rotational center, and the other fastening member 5b exits out of the opening 6b of the cutout portion 6.

When the fuel gas pump 38 turns in the counterclockwise direction, the fuel gas pump 38 no longer presses the dash panel 40, thus ensuring avoiding the pressing against the dash panel 40 by the fuel gas pump 38. This ensures avoiding the damage on the fuel gas pump 38 and the dash panel 40. With the turn, of the fuel gas pump 38, the auxiliary bracket 7 positioned on the upper side is twisted at the bent portion 7c, thus being deformed at the bent portion 7c to absorb the impact. The turn of the fuel gas pump 38 provides a space 84 between the stack frame 2 and the dash panel 40 (see FIG. 8).

In particular, in this embodiment, the fuel gas pump 38 is mounted to the stack frame 2 near the front fender 45, and the rotation axis line L1 of the motor M is inclined to approach the center line along the front-rear direction of the fuel cell vehicle 1 as approaching the vehicle front side. As a result, the fuel gas pump 38 turns in the space R1 on a side of the front fender 45 in the front compartment R, thus ensuring avoiding contact with other auxiliary machines mounted to the lower portion of the stack frame 2.

Although one embodiment of the present disclosure has been described in detail above, the present disclosure is not limited thereto, and can be subjected to various kinds of changes in design without departing, from the spirit and scope of the present disclosure described in the claims. For example, while the rotation axis line of a drive shaft of the motor that is adapted to drive the pump has been exemplified as the reference line of the fuel gas pump, the configuration is not limited to this, and a center line in the longitudinal direction passing through the center of gravity of the fuel gas pump may be used.

Although the fastening bolt has been exemplified as the rotational center around which the fuel gas pump turns away from the dash panel at the time of collision, a configuration where a shaft material such as a pin is used to turn the fuel gas pump may be employed.

In this embodiment, the gas-liquid separator projects from the fuel gas pump toward the dash panel side, the gas-liquid separator does not necessarily project from the fuel gas pump toward the dash panel side or the gas-liquid separator may be omitted as necessary.

DESCRIPTION OF SYMBOLS

1 Fuel cell vehicle
2 Stack frame
4 Bracket
4a Mounting portion
4e Through hole
5a One fastening member
5b Other fastening member
Cutout portion
6a Recessed portion
6b Opening
7 Auxiliary bracket
10 Fuel cell stack
22 Compressor
37 Gas-Liquid separator
38 Fuel gas pump (Hydrogen pump)
40 Dash panel S1, S2, S3 Space
L1 Rotation axis line of motor of fuel gas pump
L2 Reference line in front-rear direction of fuel cell vehicle
M Motor of fuel gas pump
R Front compartment
C Cabin

What is claimed is:

1. A fuel cell vehicle comprising:
a fuel cell stack; and
a fuel gas pump that circulates a part of a fuel off-gas discharged from the fuel cell stack to the fuel cell stack,
wherein the fuel cell vehicle includes a front compartment and a dash panel in a front side of the vehicle, the front compartment houses the fuel cell stack and the fuel gas pump, and the dash panel partitions the front compartment and a cabin,
wherein the fuel cell stack is placed on a stack frame, and the stack frame is secured to the front compartment,
wherein the fuel gas pump is mounted to a lower portion of the stack frame in a state of projecting from the stack frame toward the dash panel side,
wherein the fuel gas pump is secured to the stack frame via a bracket such that a rotation axis line of a motor adapted to drive the fuel gas pump inclines with respect to a reference line along a front-rear direction of the fuel cell vehicle in plan view of the fuel cell vehicle,
wherein the bracket has a mounting portion in a flat plate shape extending in a horizontal direction, and the bracket is attached to the stack frame with two fastening members at the mounting portion,
wherein one fastening member among the two fastening members secures the stack frame to the bracket in a state of being inserted through a through hole formed at the mounting portion, and the other fastening member secures the stack frame to the bracket in a state of being inserted through a cutout portion formed at the mounting portion, and
wherein the cutout portion is formed such that the other fastening member exits out of an opening of the cutout portion when the bracket turns together with the fuel gas pump with respect to the stack frame using the one fastening member inserted through the through hole as a rotational center.

2. The fuel cell vehicle of claim 1, wherein the other fastening member is released from the cutout portion when the bracket rotates relative to the stack frame about the one fastening member.

3. The fuel cell vehicle of claim 1, wherein the cutout portion includes a recessed portion configured to receive the other fastening member.

4. The fuel cell vehicle of claim 3, wherein the recessed portion has a geometry corresponding to a geometry of the other fastening member.

5. The fuel cell vehicle of claim 3, wherein the recessed portion extends inwardly into the bracket in a direction opposite the opening of the cutout portion.

* * * * *